US009525884B2

(12) United States Patent
Huang et al.

(10) Patent No.: US 9,525,884 B2
(45) Date of Patent: Dec. 20, 2016

(54) METHOD AND APPARATUS OF SLICE BOUNDARY FILTERING FOR HIGH EFFICIENCY VIDEO CODING

(75) Inventors: Yu-Wen Huang, Taipei (TW); Ching-Yeh Chen, Taipei (TW); Chih-Ming Fu, Hsinchu (TW); Chih-Wei Hsu, Taipei (TW); Shan Liu, San Jose, CA (US); Shaw-Min Lei, Hsin-chu (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 1076 days.

(21) Appl. No.: 12/978,490

(22) Filed: Dec. 24, 2010

(65) Prior Publication Data

US 2012/0106624 A1 May 3, 2012

Related U.S. Application Data

(60) Provisional application No. 61/409,309, filed on Nov. 2, 2010, provisional application No. 61/412,533, filed on Nov. 11, 2010.

(51) Int. Cl.
*H04N 19/86* (2014.01)
*H04N 19/70* (2014.01)
(Continued)

(52) U.S. Cl.
CPC .......... *H04N 19/439* (2014.11); *H04N 19/117* (2014.11); *H04N 19/136* (2014.11);
(Continued)

(58) Field of Classification Search
CPC ........ H04N 19/13; H04N 19/70; H04N 19/86; H04N 19/436; H04N 7/26
(Continued)

(56) References Cited

U.S. PATENT DOCUMENTS 4,754,492 A * 6/1988 Malvar .................. H04N 19/86 375/240.2
5,796,875 A * 8/1998 Read ........................ G06T 5/20 382/261
(Continued)

FOREIGN PATENT DOCUMENTS

WO WO 2010/002214 1/2010

OTHER PUBLICATIONS

Moriyoshi, et al.: "Real-time H.264 Encoder with Deblocking Filter Parallelization"; System IP Core Research Laboratories; copyright 2008; pp. 1-2.
(Continued)

*Primary Examiner* — Obafemi Sosanya
(74) *Attorney, Agent, or Firm* — McClure, Qualey & Rodack, LLP

(57) ABSTRACT

An apparatus and method for video coding having intra-slice deblocking, intra-slice adaptive loop filter, and intra-slice adaptive offset are disclosed. In a video coding system, a picture is often divided into slices and each slice is independently processed so that errors or missing data from one slice cannot propagate to any other slice within the picture. In the recent high efficiency video coding (HEVC) development, deblock filtering (DF), adaptive loop filter (ALF) and adaptive offset (AO) may be applied to reconstructed slices. When the processing is applied across slice boundaries, it may rely on pixels outside the current slice and cause dependency of the current slice on other slice(s). Consequently, the DF/ALF/AO processing on a reconstructed slice may have to wait until the reconstructed slices that it is dependent from complete the DF/ALF/AO processing. To overcome the slice boundary issue, intra-slice DF/ALF/AO is developed that does not rely on any pixel outside the currently slice. An optional slice boundary filter may be
(Continued)

applied to slice boundaries after all slices are processed by the intra-slice DF/ALF/AO.

28 Claims, 18 Drawing Sheets

(51) Int. Cl.
| | |
|---|---|
| H04N 19/436 | (2014.01) |
| H04N 19/42 | (2014.01) |
| H04N 19/174 | (2014.01) |
| H04N 19/117 | (2014.01) |
| H04N 19/136 | (2014.01) |
| H04N 19/82 | (2014.01) |
| H04N 19/13 | (2014.01) |
| H04N 7/26 | (2006.01) |
| H04N 19/115 | (2014.01) |
| H04N 19/61 | (2014.01) |

(52) U.S. Cl.
CPC ......... *H04N 19/174* (2014.11); *H04N 19/436* (2014.11); *H04N 19/70* (2014.11); *H04N 19/82* (2014.11); *H04N 19/86* (2014.11); *H04N 19/115* (2014.11); *H04N 19/61* (2014.11)

(58) Field of Classification Search
USPC .................................................. 375/240.02
See application file for complete search history.

(56) References Cited

U.S. PATENT DOCUMENTS

| | | |
|---|---|---|
| 2005/0053158 A1 | 3/2005 | Regunathan et al. |
| 2006/0078209 A1 | 4/2006 | Kobayashi |
| 2007/0014360 A1* | 1/2007 | Botzko .............. H04N 21/2383 375/240.16 |
| 2010/0266175 A1* | 10/2010 | Seung .................. G06T 7/0081 382/128 |
| 2011/0026600 A1* | 2/2011 | Kenji ..................... H04N 19/70 375/240.24 |
| 2011/0090967 A1* | 4/2011 | Chen ..................... H04N 19/70 375/240.16 |
| 2011/0103475 A1* | 5/2011 | Alshina .................. H04N 19/13 375/240.12 |
| 2012/0081241 A1* | 4/2012 | Misra .................. H03M 7/4093 341/107 |
| 2012/0099657 A1* | 4/2012 | Tanaka ................. H04N 19/436 375/240.23 |
| 2015/0016525 A1 | 1/2015 | Alshina et al. |

OTHER PUBLICATIONS

Tsai, et al.: "Slice Boundary Processing and Picture Layer Raw Byte Sequence Payload"; Joint Collaborative Team on Video Coding; (published on Jan. 20-28, 2011); pp. 1-14.

Roitzsch, Michael: 1. Slice-Balancing H.264 Video Encoding for Improved Scalability of Multicore Decoding; Technische Universitat Dresden, Department of Computer Science; Sep. 30-Oct. 3, 2007; pp. 269-278.

Tsai, et al.: "3. TE10 subject 2 Coding unit synchronous picture quadtree-based adaptive loop filter (QALF)"; Joint Collaborative Team on Video Coding; pp. 1-12; (published on Oct. 7-15, 2010).

* cited by examiner

| Category | Condition | Note |
|---|---|---|
| 0 | P < 4 neighbors | Local min |
| 1 | P < 3 neighbors && P = $4^{th}$ neighbor | Object edge |
| 2 | P < 3 neighbors && P > $4^{th}$ neighbor | Object edge |
| 3 | P > 3 neighbors && P < $4^{th}$ neighbor | Object edge |
| 4 | P > 3 neighbors && P = $4^{th}$ neighbor | Object edge |
| 5 | P > 4 neighbors | Local max |
| 6 | None of the above | Other |

*Fig. 7B*

| seq_parameter_set_rbsp( ) { | C | Descriptor |
|---|---|---|
| ... | | |
| slice_boundary_filter_flag | 1 | u(1) |
| if( slice_boundary_filter_flag ) { | | |
|   slice_boundary_filter_in_loop_flag | 1 | u(1) |
| } | | |
| adaptive_loop_filter_pic_layer_flag | 1 | u(1) |
| ... | | |
| } | | |

*Fig. 14A*

| pic_layer_rbsp( ) { | C | Descriptor |
|---|---|---|
| pic_order_cnt_lsb | 2 | u(v) |
| if( adaptive_loop_filter_pic_layer_flag ) { | | |
|   alf_param( ) | 2 | |
| } | | |
| } | | |

*Fig. 14B*

| slice_header( ) { | C | Descriptor |
|---|---|---|
| ... | | |
| if( !adaptive_loop_filter_pic_layer_flag ) { | | |
|   alf_param( ) | 2 | |
| } | | |
| ... | | |
| } | | |

*Fig. 14C*

| seq_parameter_set_rbsp( ) { | C | Descriptor |
|---|---|---|
| ... | | |
| slice_boundary_filter_flag | 1 | u(1) |
| if( slice_boundary_filter_flag ) { | | |
|   slice_boundary_filter_in_loop_flag | 1 | u(1) |
| } | | |
| ... | | |
| } | | |

*Fig. 15A*

| pic_layer_rbsp( ) { | C | Descriptor |
|---|---|---|
|   pic_order_cnt_lsb | 2 | u(v) |
|   alf_param( ) | 2 | |
| } | | |

*Fig. 15B*

| slice_header( ) { | C | Descriptor |
|---|---|---|
| ... | | |
|   adaptive_loop_filter_pic_layer_flag | 1 | u(1) |
|   if( !adaptive_loop_filter_pic_layer_flag ) { | | |
|     alf_param( ) | 2 | |
|   } | | |
| ... | | |
| } | | |

*Fig. 15C*

METHOD AND APPARATUS OF SLICE BOUNDARY FILTERING FOR HIGH EFFICIENCY VIDEO CODING

CROSS REFERENCE TO RELATED APPLICATIONS

The present invention claims priority U.S. Provisional Patent Application No. 61/409,309, filed Nov. 2, 2010, entitled "Slice Boundary Filter for High Efficiency Video Coding (HEVC)", and U.S. Provisional Patent Application, No. 61/412,533, filed Nov. 11, 2010, entitled "Slice and slice boundary filter for HEVC". These U.S. Provisional Patent Applications are hereby incorporated by reference in their entireties.

FIELD OF THE INVENTION

The present invention relates to video coding. In particular, the present invention relates to coding techniques associated with filtering and processing at slice boundaries.

BACKGROUND

For digital video compression, intra-prediction and motion compensated inter-frame coding are very effective compression techniques and have been widely adopted in various coding standards, such as MPEG-1/2/4 and H.261/H.263/H.264/AVC. In most coding systems, a macroblock, consisting of 16×16 pixels, is primarily used as a unit for motion estimation and subsequent processing. Nevertheless, in the recent development of the next generation standard named High Efficiency Video Coding (HEVC), a more flexible block structure is being adopted as a unit for processing. The unit of this flexible block structure is termed as coding unit (CU). The coding unit can start with a largest coding unit (LCU) and is adaptively divided into smaller blocks using a quadtree to achieve a better performance Blocks that are no longer split into smaller coding units are called leaf CUs, and video data in the same leaf CU are subject to the coding configuration and share the same coding information. The quadtree partition can be recursively applied to each of the LCUs until it reaches the smallest CU, the sizes of the LCU and the smallest CU (SCU) are properly selected to balance the tradeoff between system complexity and performance.

In the H.264/AVC coding standard, the underlying video frames are divided into slices, where each slice consists of non-overlapping macroblocks as the smallest coding unit. Each slice can be coded as an I-slice (intra-coded slice), P-slice (predictive slice) or B-slice (bi-directional slice) and the compressed data are packed into slice-layer data. Since the slice is independently processed, errors or missing data from one slice cannot propagate to any other slice within the picture. Furthermore, redundant slices are permitted for robust transmission. In the recent HEVC development, a slice contains multiple LCUs instead of macroblocks. Furthermore, HEVC may allow a slice to contain a fractional number of LCUs to provide fine coding granularities in the future. On the other hand, HEVC adopts deblocking filtering and adaptive loop filtering to improve objective as well as subjective quality. Both deblocking filtering and adaptive loop filtering operate on an underlying pixel and its neighboring pixels. Consequently, the use of deblocking filtering and adaptive loop filtering at slice boundaries will cause the loss of independent processing feature of slice structure. If deblocking filtering and adaptive loop filtering are not applied to slice boundaries, artifacts may be noticeable at slice boundaries. It is desirable to develop a method and apparatus of video filtering and processing that can overcome the issue of data dependency on neighboring slices at slice boundaries.

BRIEF SUMMARY OF THE INVENTION

An apparatus and method for coding of video pictures using intra-slice ALF (adaptive loop filter) and/or intra-slice AO (adaptive offset) are disclosed. Each of the video pictures is partitioned into slices and each of the slices is partitioned into CUs (coding units). In one embodiment according to the present invention, the apparatus and method for video coding comprises steps of reconstructing each of the slices to form a reconstructed slice and processing the reconstructed slice based on intra-slice ALF (adaptive loop filtering), intra-slice AO (adaptive offset), or a combination of ALF and AO. The apparatus and method may include optional deblocking the reconstructed slice based on intra-slice DF (deblock filtering), wherein the intra-slice DF is applied to the CUs of the reconstructed slice before processing the reconstructed slice based on the intra-slice ALF, the intra-slice AO, or a combination of the intra-slice ALF and the intra-slice AO. Furthermore, the apparatus and method may include an optional step of incorporating SBF (slice boundary filter), wherein the SBF can be applied across slice boundaries to filter slice boundary pixels. The intra-slice ALF and AO utilize pixel extension or bypassing to removing the dependency on pixels from other slices, wherein the pixel extension methods include vertical-first, horizontal-first, Hamming distance, and mirroring padding. Various syntax elements are incorporated into video bitstream according to the present invention to allow a system embodying the present invention to choose among various possible configurations.

An apparatus and method for decoding of a video bitstream using intra-slice ALF (adaptive loop filter) and/or intra-slice AO (adaptive offset) are disclosed. The bitstream corresponds to compressed video pictures, wherein each of the video pictures is partitioned into slices and each of the slices is partitioned into CUs (coding units). In one embodiment according to the present invention, the apparatus and method comprise steps of reconstructing each of the slices to form a reconstructed slice according to the video bitstream, recovering ALF and/or AO information from the video bitstream, and processing the reconstructed slice using intra-slice ALF (adaptive loop filtering) and/or intra-slice AO (adaptive offset) according to the ALF and/or AO information to provide a processed slice. In another embodiment according to the present invention, the apparatus and method further comprise steps of recovering SBF (slice boundary filter) information from the video bitstream, and processing the processed slice using SBF according to the SBF information, wherein the SBF can be applied across slice boundaries to filter slice boundary pixels. Furthermore, the apparatus and method according to the present invention utilize various syntax elements incorporated into the video bitstream to choose a configuration for proper operation.

BRIEF DESCRIPTION OF THE DRAWINGS

FIG. 7B illustrates an example of adaptive offset—extreme correction based on pixel category, where seven categories are defined according to pixel P and its neighboring pixels p1-p4.

FIG. 14A illustrates an exemplary sequence parameter set syntax associated with the intra-slice ALF/AO and slice boundary filter according to the present invention.

FIG. 14B illustrates an exemplary picture layer syntax associated with the intra-slice ALF/AO and slice boundary filter according to the present invention.

FIG. 14C illustrates an exemplary slice header syntax associated with the intra-slice ALF/AO and slice boundary filter according to the present invention.

FIG. 15A illustrates an alternative sequence parameter set syntax associated with the intra-slice ALF/AO and slice boundary filter according to the present invention.

FIG. 15B illustrates an alternative picture layer syntax associated with the intra-slice ALF/AO and slice boundary filter according to the present invention.

FIG. 15C illustrates an alternative slice header syntax associated with the intra-slice ALF/AO and slice boundary filter according to the present invention.

DETAILED DESCRIPTION OF THE INVENTION

For digital video compression, intra-prediction and motion compensated inter-frame coding are very effective compression techniques and have been widely adopted in various coding standards, such as MPEG-1/2/4 and H.261/H.263/H.264/AVC. In most coding systems, a macroblock of 16×16 pixels is primarily used as a unit for motion estimation and subsequent processing. Nevertheless, in the recent high efficiency video coding (HEVC) development, a more flexible block structure is being adopted as a unit for processing which is termed as coding unit (CU). The coding process may start with a largest coding unit and then adaptively divides the coding unit into smaller blocks. The partitioning of coding units may be based on quadtree structure to partition the coding unit into four smaller coding units. The quadtree split can be recursively applied, starting with the largest CU (LCU) until it reaches the smallest CU (SCU) where the sizes of the LCU and the SCU are properly designed to achieve good system performance. In order to suppress propagation of coding noise (for example, quantization errors), loop filtering has been used in various coding systems, such as the deblocking filter (DF) in H.264/AVC and HEVC, and adaptive loop filtering (ALF) and adaptive offset (AO) in HEVC. The use of DF and ALF/AO at slice boundaries may require pixel data from other slices and causes the loss of independent slice processing feature.

The DF for HEVC is operated in an infinite impulse response (IIR) fashion where a processed current pixel is stored upon completion of DF processing for each block boundary so that the processed current pixel will be used in processing of any subsequent pixel of the same slice. Therefore the order of DF has to be pre-defined so that a decoder can perform DF in the same order for proper decoding. When DF is applied to slice boundaries, a reconstructed slice cannot start DF until the pixels of the slices that it depends on have completed DF. Therefore the conventional DF at slice boundaries will cause long processing latency. The ALF processing on the other hand is often operated in a finite impulse response (FIR) fashion where the ALF operation relies on non-ALF processed data within the filter window. Nevertheless, when ALF is applied to slice boundaries, it will cause the loss of independent slice processing feature. The AO processing often is also operated in the FIR fashion and will cause the loss of independent slice processing feature. Consequently, it is very desirable to develop new DF, ALF and AO algorithms that can maintain the independent slice processing feature when applied to slices of a picture. Also it is desirable to develop required bitstream syntax to facilitate encoder-decoder coordination.

Figure 1:
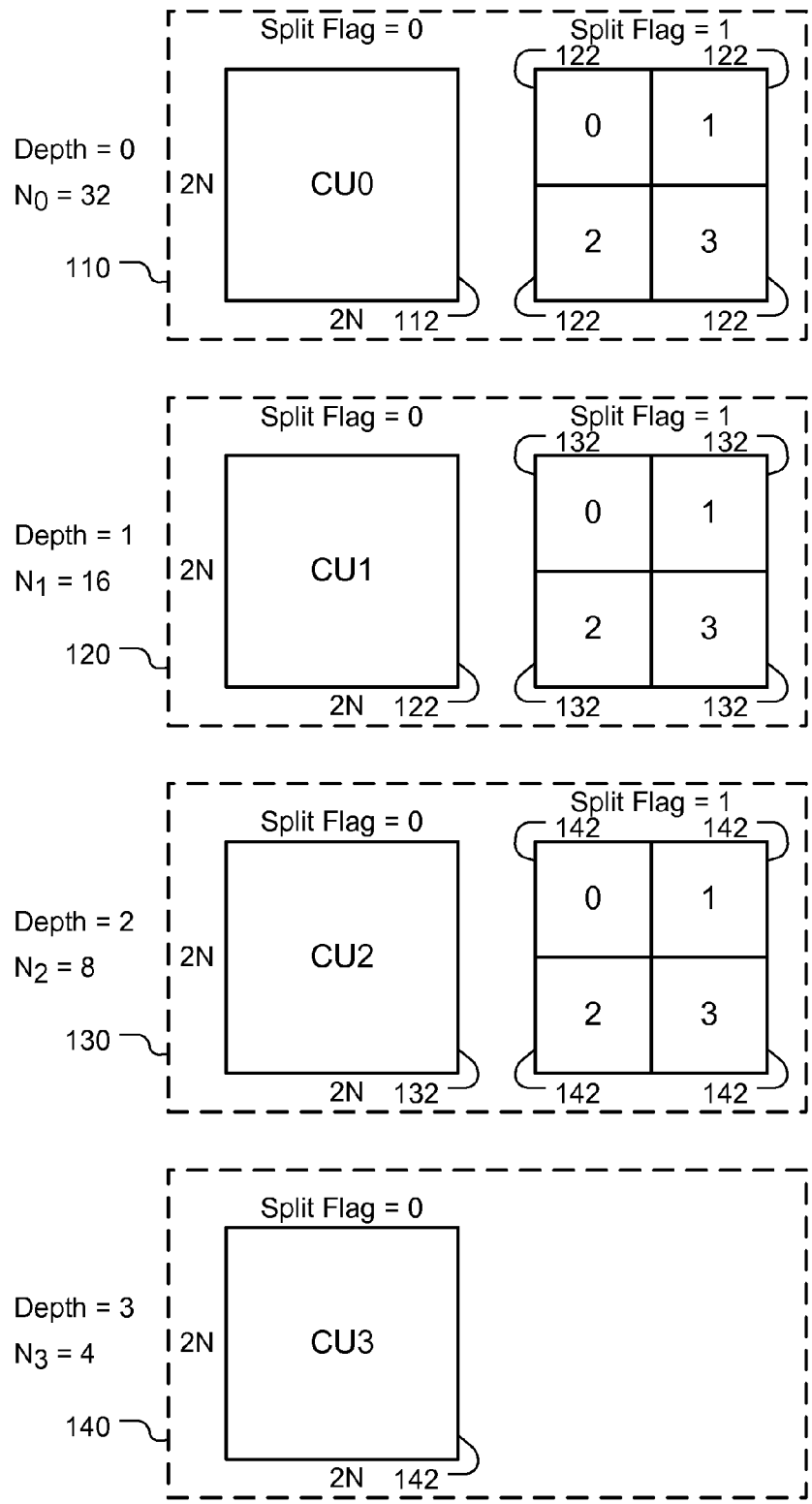
FIG. 1 illustrates an exemplary coding unit partition based on the quadtree.

FIG. 1 illustrates an exemplary coding unit partition based on a quadtree. At depth=0, the initial coding unit CU0 112 consisting of 64×64 pixel, is the largest CU. The initial coding unit CU0 112 is subject to quadtree split as shown in block 110. A split flag 0 indicates the underlying CU is not split and, on the other hand a split flag 1 indicates the underlying CU is split into four smaller coding units 122 by the quadtree. The resulting four coding units are labeled as 0, 1, 2 and 3 and each resulting coding unit becomes a coding unit for further split in the next depth. The coding units resulted from coding unit CU0 112 are referred to as CU1 122. After a coding unit is split by the quadtree, the resulting coding units are subject to further quadtree split unless the coding unit reaches a pre-specified smallest CU (SCU) size. Consequently, at depth 1, the coding unit CU1 122 is subject to quadtree split as shown in block 120. Again, a split flag 0 indicates the underlying CU is not split and, on the other hand a split flag 1 indicates the underlying CU is split into four smaller coding units CU2 132 by the quadtree. The coding unit CU2 132, has a size of 16×16 and the process of the quadtree splitting as shown in block 130 can continue until a pre-specified smallest coding unit is reached. For example, if the smallest coding unit is chosen to be 8×8, the coding unit CU3 142 at depth 3 will not be subject to further split as shown in block 140. The collection of quadtree partitions of a picture to form variable-size coding units constitutes a partition map for the encoder to process the input image area accordingly. The partition map has to be conveyed to the decoder so that the decoding process can be performed accordingly.

Figure 2:
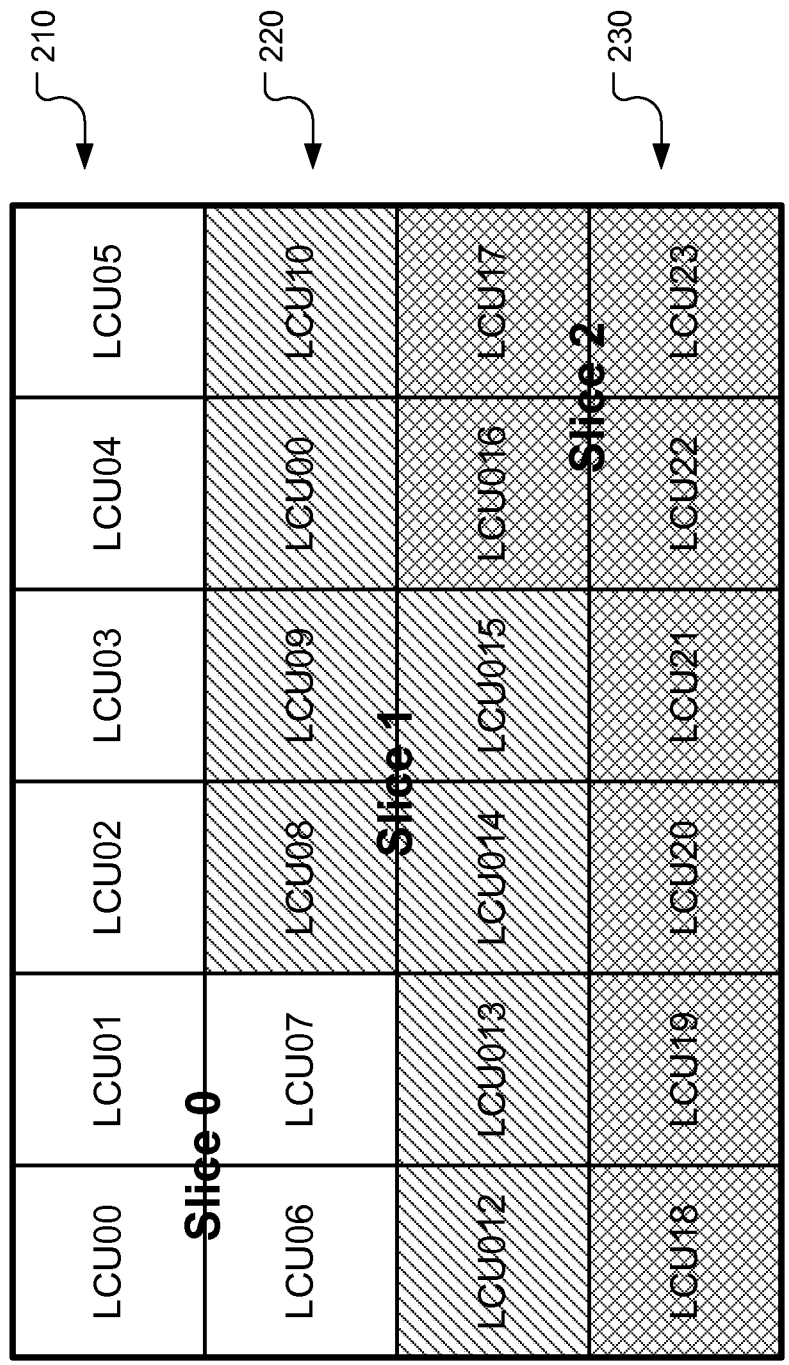
FIG. 2 illustrates an example of slice partition where the partition boundaries are aligned with the largest coding unit.

In H.264/AVC video coding standard, the underlying video pictures are divided into slices, where each slice consists of non-overlapping macroblocks as the smallest coding unit. Each slice can be coded as an I-slice (intra-coded slice), P-slice (predictive slice) or B-slice (bi-directional slice) and the resulted data are packed into slice-layer data. In the high efficiency video coding (HEVC) coding standard being developed, the largest coding unit (LCU) is used as an initial coding unit. The LCU may be adaptively divided into smaller CUs for more efficient processing. The macroblock-based slice partition for H.264 can be extended to the LCU-based slice partition for HEVC. An example of the LCU-based slice partition for HEVC is shown in FIG. 2 where twenty-four LCUs are partitioned into three slices. LCU00 though LCU07 are assigned to slice 0, 210, LCU08 though LCU15 are assigned to slice 1, 220, and LCU16 though LCU23 are assigned to slice 2, 230. As shown in FIG. 2, the slice boundary is aligned with the LCU boundary. While the LCU-aligned slice partition is easy to implement, the size of LCU is typically much larger than the size of macroblock and the LCU-aligned slice may not be able provide enough granularities to support dynamic environment of coding systems. Therefore, a non-LCU aligned slice partition is being proposed in the HEVC standard development.

Figure 3:
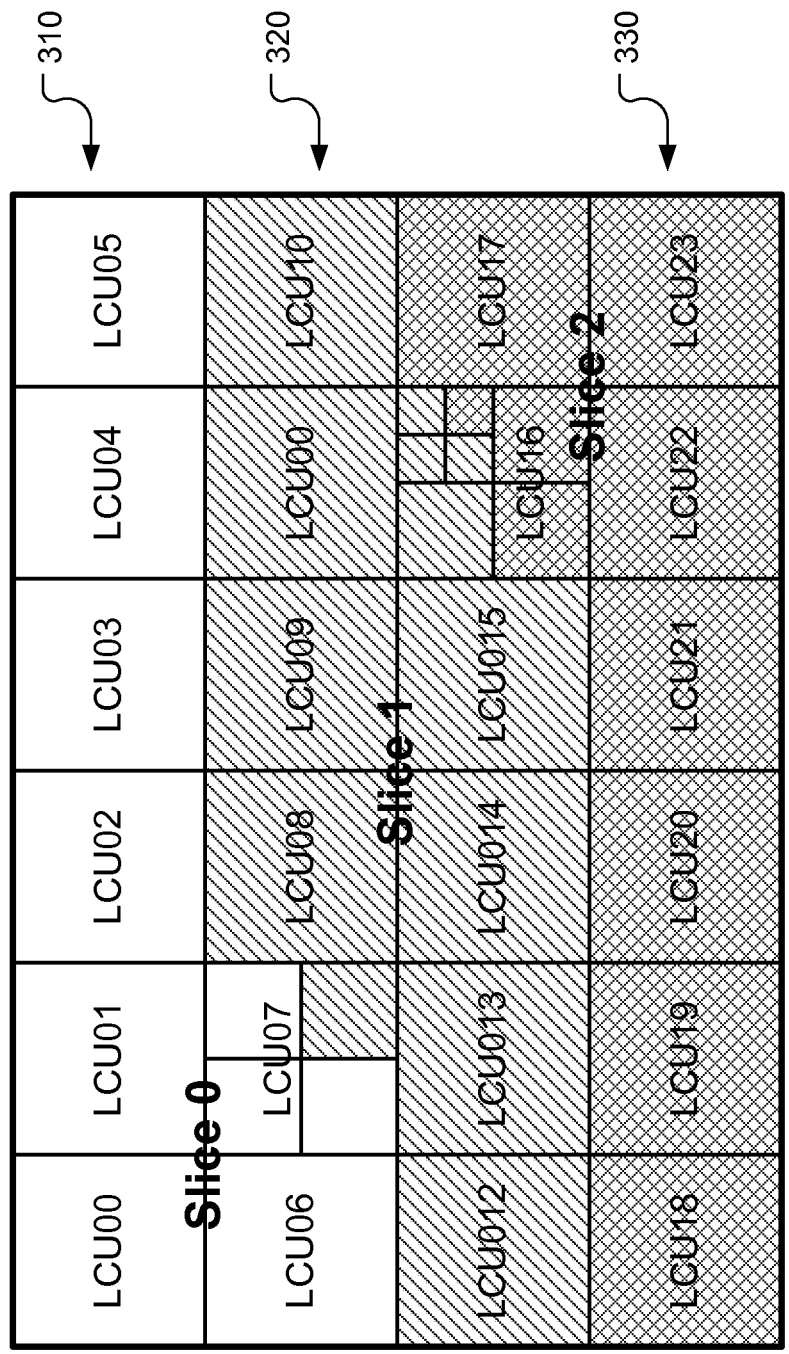
FIG. 3 illustrates an example of slice partition where the slice may include fractional LCUs.

FIG. 3 illustrates an example of slice structure with the fractional LCU partition, where the partition boundaries may run through the largest coding units. Slice 0, 310 includes LCU00 through LCU06 and terminates at a leaf CU of LCU07. LCU07 is split between slice 0, 310 and slice 1, 320. Slice 1, 320 includes the remaining leaf CUs of LCU07 not included in slice 0, 310 and LCU08 through LCU15, and part of LCU16. Slice 1, 420 terminates at a leaf CU of LCU16. LCU16 is split between slice 1, 320 and slice 2, 330. Slice 2, 330 includes the remaining leaf CUs of LCU16 not included in slice 1, 320 and LCU17 through LCU23.

Figure 4:
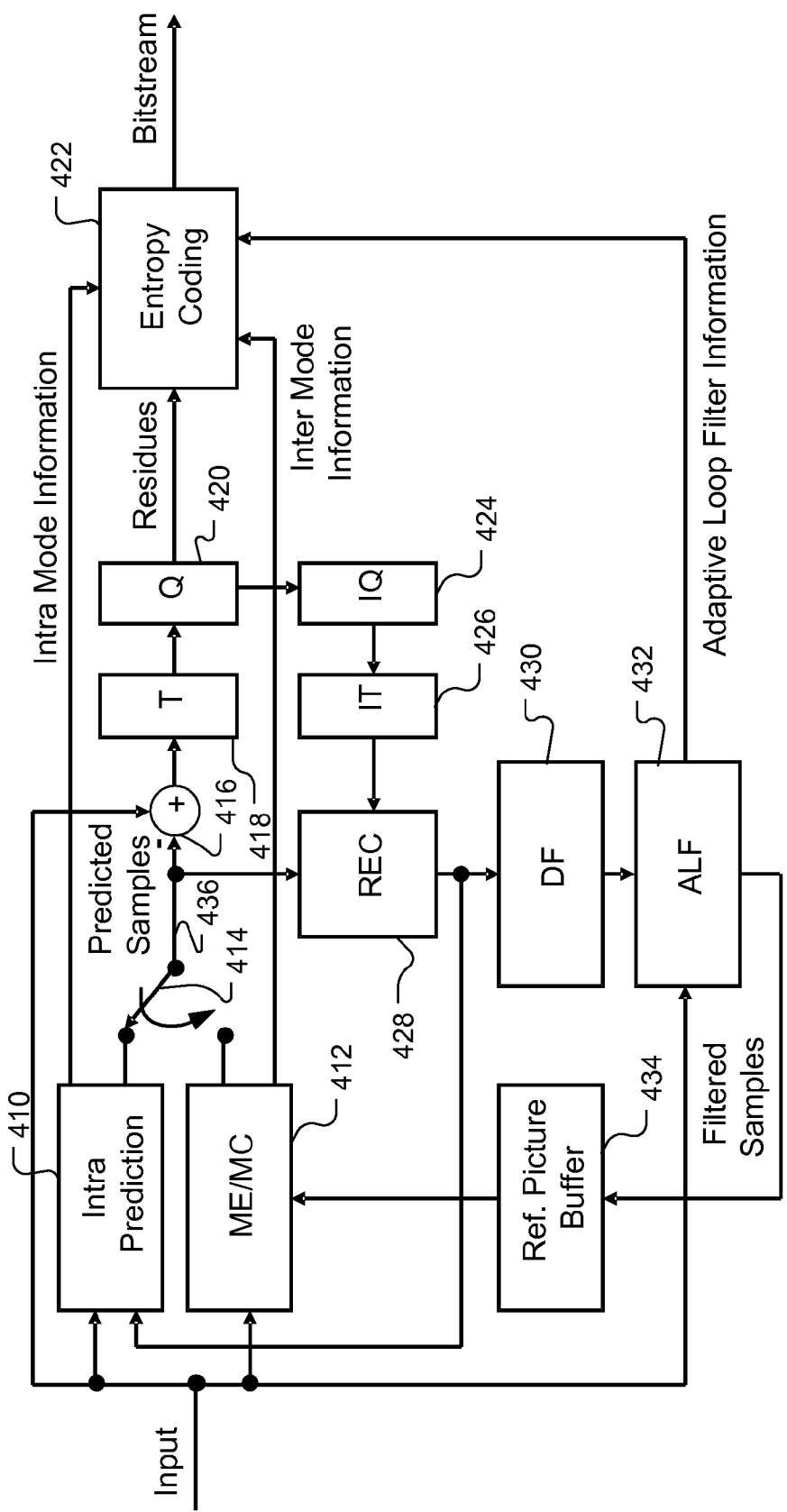
FIG. 4 illustrates a system block diagram of an exemplary video encoder for high efficiency video coding.

In the encoder system for HEVC, the video data are divided into slices for independent processing in order to avoid error propagation from one slice to another slice in the same picture. The slice may contain a number of fractional largest coding units (LCUs) and each LCU may be further partitioned into coding units based on quadtree and video compression is applied to individual coding units. The motion estimation/compensation for conventional coding system often is based on the macroblock. The exemplary encoder shown in FIG. 4 represents a system using intra/inter-prediction. Intra-prediction 410 is responsible to provide prediction data based on video data in the same picture. For inter-prediction, motion estimation (ME) and motion compensation (MC) 412 is used to provide prediction data based on video data from other picture or pictures. Switch 414 selects intra-prediction or inter-prediction data and the selected prediction data are supplied to adder 416 to form prediction errors, also called residues. The prediction error is then processed by transformation (T) 418 followed by quantization (Q) 420. The transformed and quantized residues are than coded by entropy coding 422 to form a bitstream corresponding to the compressed video data. The bitstream associated with the transform coefficients is then packed with side information such as motion, mode, and other information associated with the image area. The side information may also be subject to entropy coding to reduce required bandwidth and accordingly the data associated with the side information are provided to entropy coding 422 as shown in FIG. 4. When an inter-prediction mode is used, a reference picture or reference pictures have to be reconstructed at the encoder end. Consequently, the transformed and quantized residues are processed by inverse quantization (IQ) 424 and inverse transformation (IT) 426 to recover the residues. The residues are then added back to prediction data 436 at reconstruction (REC) 428 to reconstruct video data. The reconstructed video data may be stored in reference picture buffer 434 and used for prediction of other frames. However, deblocking filter 430 and adaptive loop filter 432 are applied to the reconstructed video data before the video data are stored in the reference picture buffer in order to improve video quality. The adaptive loop filter information may have to be transmitted in the bitstream so that a decoder can properly recover the required information in order to apply the adaptive loop filter. Therefore, adaptive loop filter information from ALF 432 is provided to entropy coding 422 for incorporation into the final bitstream. The use of DF and ALF are optional. Adaptive offset (AO) which is not explicitly shown in FIG. 4, is another optional processing that can improve image quality by correcting intensity offset caused by processing. The use of AO can be between ALF 432 and reference picture buffer 434, or between DF 430 and ALF 432.

Figure 5:
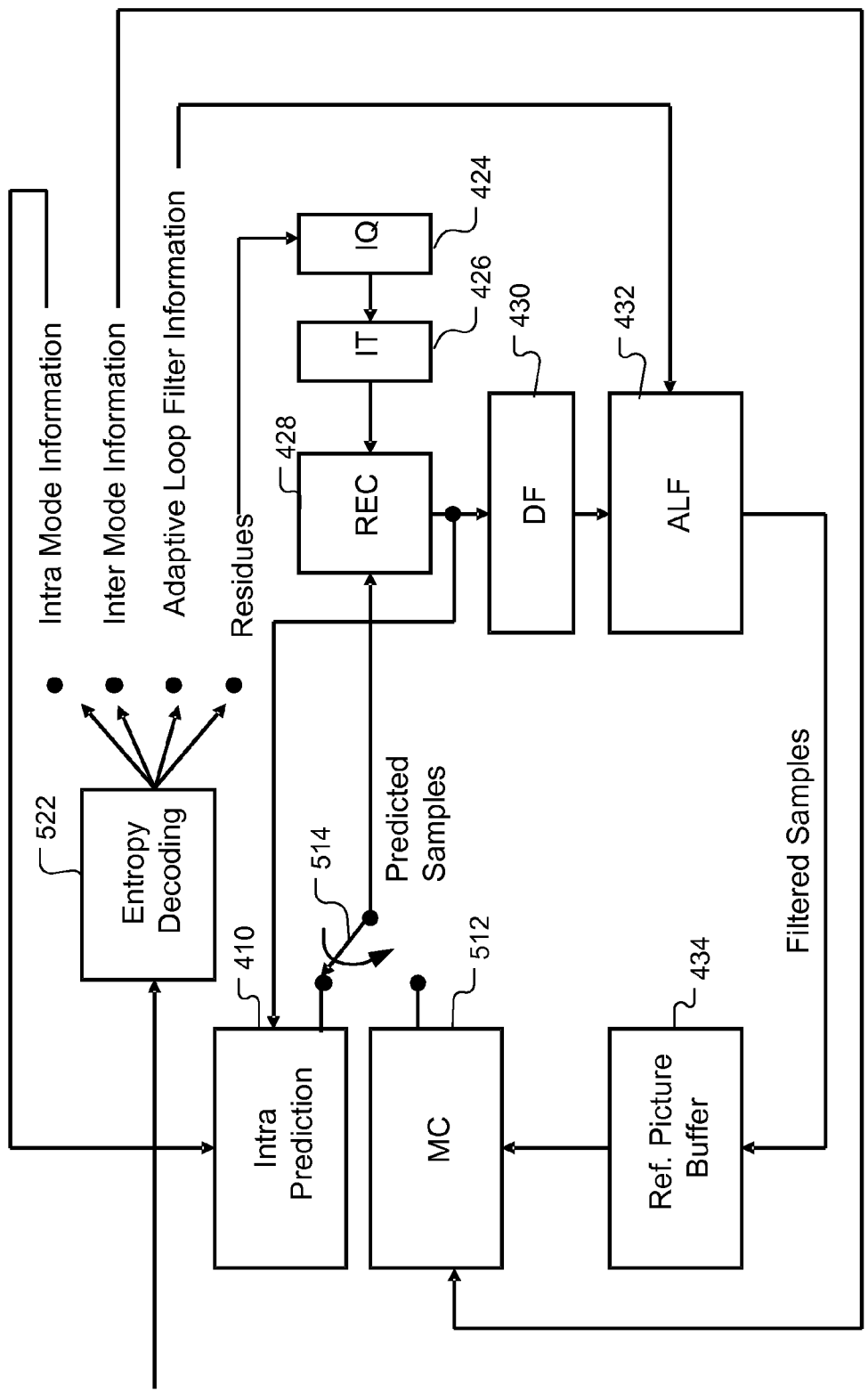
FIG. 5 illustrates a system block diagram of an exemplary video decoder for high efficiency video coding.

FIG. 5 illustrates a system block diagram of a video decoder for high efficiency video coding. Since the encoder also contains parts for reconstructing the video data, some decoder parts are already used in the encoder. However, the entropy decoder 522 is not used by the encoder. Furthermore, only motion compensation 512 is required for the decoder side. The switch 514 selects intra-prediction or inter-prediction and the selected prediction data are supplied to reconstruction (REC) 428 to be combined with recovered residues. Besides performing entropy decoding for compressed video data, entropy decoding 522 is also responsible for entropy decoding of side information and provides the side information to respective blocks. For example, intra mode information is provided to intra-prediction 410, inter mode information is provided to motion compensation 512, adaptive loop filter information is provided to ALF 432 and residues are provided to inverse quantization 424. The residues are processed by IQ 424, IT 426 and subsequent reconstruction process to reconstruct the video data. The decoder may utilize AO, which is not explicitly shown in FIG. 5, to process reconstructed video data if the AO is used in the encoder side. According to side information in the bitstream or other means, the decoder can configure AO properly.

As shown in FIG. 4 and FIG. 5, both DF and ALF are used to process the reconstructed picture before it is stored in the reference picture buffer 434. DF is performed macroblock by macroblock in H.264/AVC and LCU by LCU in HEVC. When a picture is divided into slices, DF may be performed across slice boundaries. In AVC and HEVC, deblocking of slice boundaries may rely on deblocked pixels from other slice or slices. Since DF is applied in an IIR fashion, a processing order of blocks in a slice has to be pre-defined so that a decoder will follow the same processing order as the encoder. Similarly, the processing order of slices has to be predefined as well if DF is applied across slice boundaries so that the decoder will follow the same processing order as the encoder. Deblocking of a current slice cannot start until a prior slice or slices are deblocked if the current slice depends on the prior slice or slices. For example, slices of the lower part of one picture may be received by the decoder earlier than slices of the upper part of the picture. Deblocking of the lower part slices cannot be started until the upper part slices are reconstructed and deblocked if the slice processing order is from top to bottom of the picture. ALF and/or AO may also be applied across slice boundaries in a way similar to DF and faces the same problem as DF. When any of DF, ALF and AO is applied across slice boundaries, the processing of slices within a frame is no longer independent of other slice, and a slice may have to wait until the processing of its DF, ALF, or AO dependent slice(s) is(are) complete. Such dependency will prevent concurrent DF, ALF and AO processing. To overcome this issue, intra-slice DF, ALF and AO are disclosed which enable a coding system to perform independent slice encoding or decoding. An optional slice boundary filter is also disclosed that can be used to reduce artifacts around slice boundaries.

Figure 7A:
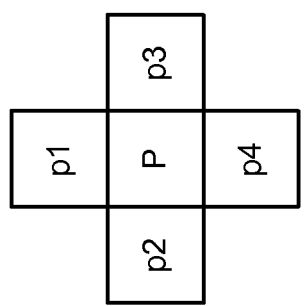
FIG. 7A illustrates an example of adaptive offset—extreme correction based on pixel category, where the category is determined according to pixel P and its neighboring pixels p1-p4.
Figure 6:
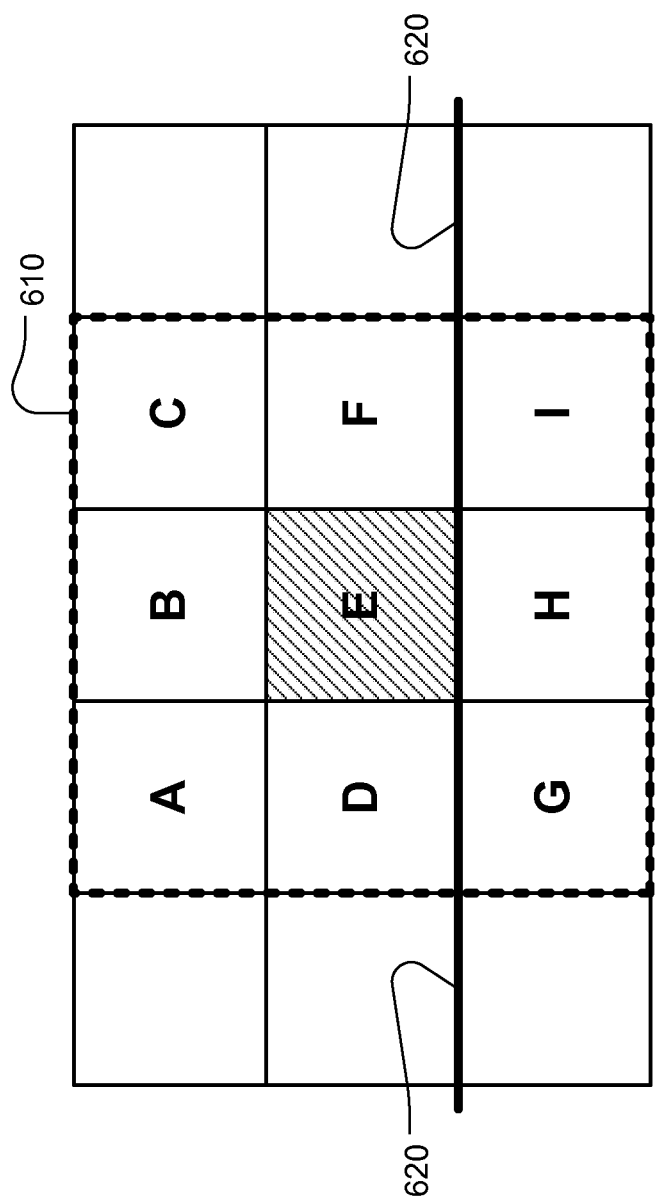
FIG. 6 illustrates an example of adaptive loop filtering across a slice boundary.

FIG. 6 illustrates an example of adaptive loop filtering across a slice boundary 620, where a 3×3 filter 610 is used. The ALF operation for pixel E will require pixels G, H and I from other slice. The adaptive offset (AO) is being considered for HEVC and will face the same boundary issue. For simplicity, most examples illustrated are based on ALF. Nevertheless, the method can be applied to AO with or without modification. After various processing during reconstruction, DF and ALF, the pixel intensity may be offset from the original video data. In order to overcome the offset problems, McCann et al. disclosed a content adaptive extreme correction in "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, DE, 15-23 Apr., 2010. The extreme correction process is one version of AO that classifies pixels processed by deblocking into a number of categories based on the current pixel value P and values of four neighboring pixels p1-p4, corresponding to top, left, bottom and right pixels respectively as shown in FIG. 7A. The use of content information based on neighboring pixels can explore local edge characteristics and may result in improved performance in terms of better visual quality or bit rate reduction. There are a total of seven categories defined by McCann et al. as shown in FIG. 7B. For category 0, the pixel P is a local minimum and is also called a valley. For category 5, the pixel P is a local maximum and is also called a peak. For categories 1, 2, 3 and 4, the pixel P is at an object edge. For pixels in each category except for category 6, the difference between the mean of processed video data and the mean of original video data is computed and transmitted to the decoder. AO can be utilized between DF and ALF, or between ALF and reference picture buffer. The offset Vd(c) is calculated for each category c. The category offset is calculated as the difference between the average intensity of original pixels Vo(c) and the average intensity of reconstructed pixels Vr(c), i.e., Vd(c)=Vo(c)−Vr(c).

Figure 8:
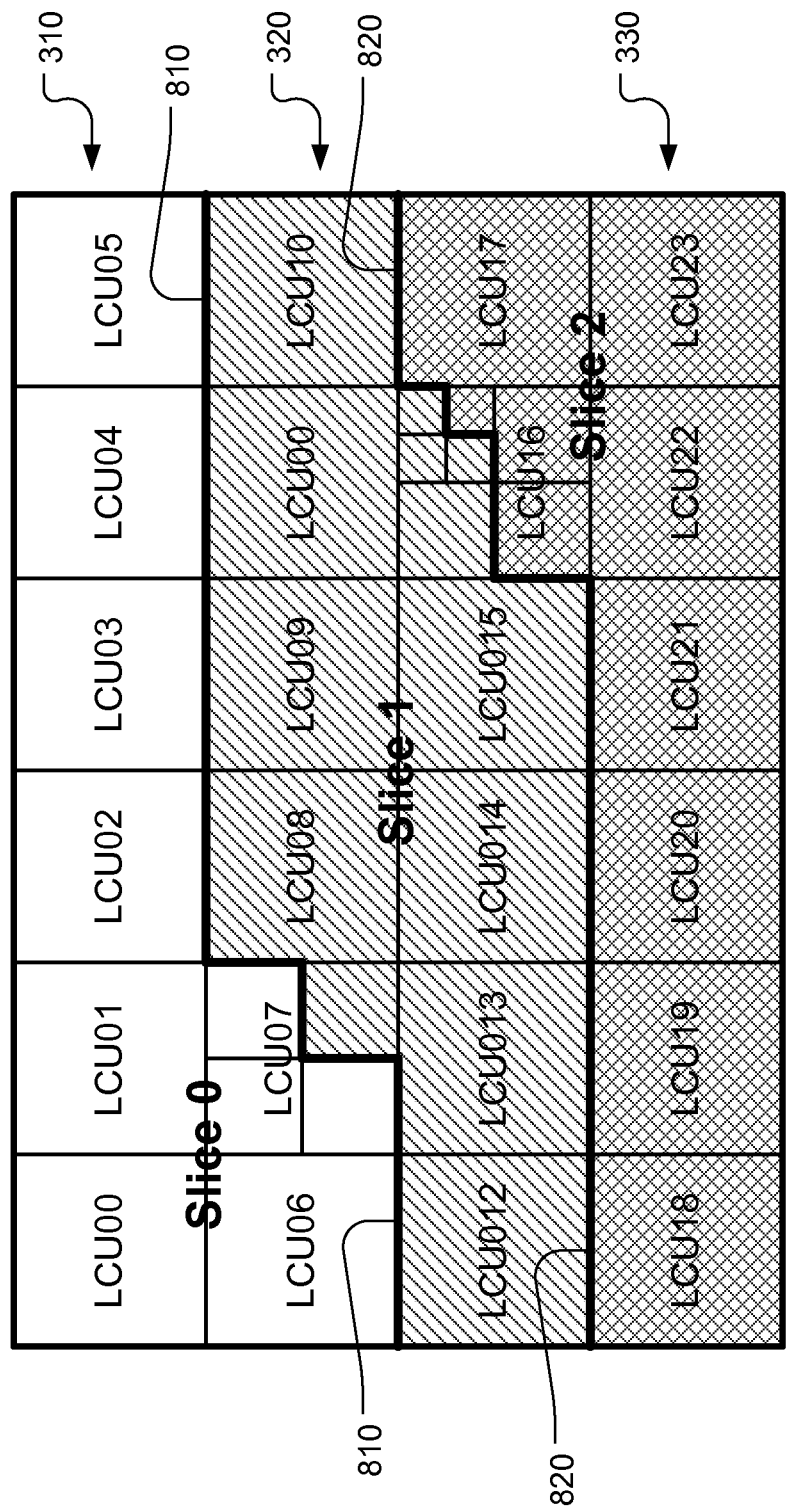
FIG. 8 illustrates an example of intra-slice deblocking filtering/adaptive loop filtering/adaptive offset at slice boundaries using data within the slice only.

In a system based on conventional DF, ALF and AO processes, the operations of DF, ALF and AO for a slice may have to wait for other slices to complete due to its dependency on other slices. DF process is performed in an infinite impulse response (IIR) fashion, where DF is done on a CU by CU basis and deblocked pixels are used when DF involves pixels from previously processed CUs. On the other hand, ALF and AO are often performed in a finite impulse response (FIR) fashion and do not need to wait for neighboring CUs to complete. Nevertheless, ALF and AO are performed on pixels processed by DF. Therefore, the system based on conventional DF results in long decoding latency. For example, if slice 2, 330 is received earlier than slice 0, 310 and slice 1, 320, DF, ALF and AO processes for slice 2, 330 must wait for slice 0, 310 and slice 1, 320 reconstructed and deblocked. In the above example, the encoder performs DF according to a raster scan order and slices 0, 1 and 2 are processed in sequential order. In order to facilitate independent decoding of each slice, DF and ALF processes are performed inside each slice without the need of any data outside slice boundaries. A DF/ALF/AO that only needs pixels from the current slice is termed as intra-slice DF/ALF/AO. A slice boundary filter (SBF) is added to filter across slice boundaries after all slices are processed by the intra-slice DF/ALF/AO. The SBF can be enabled or disabled in sequence parameter set (SPS) of the bitstream. The SBF can be used in-loop or post-loop. The post-loop configuration is also known as post-processing configuration in the field. In-loop SBF is performed within the video reconstruction loop where filtered samples are stored into the reference picture buffer for predicting future pictures. On the other hand, post-loop SBF is performed outside the reconstruction loop and filtered samples are used for display only without being stored in the reference picture buffer 434. Post-loop SBF is also referred to as post-loop SBF. The in-loop or post-loop selection is also conveyed in the SPS. FIG. 8 illustrates an example of intra-slice DF/ALF/AO that only use data within the slice. Slice boundary 810 is between slice 0, 310 and slice 1, 320 and slice boundary 820 is between slice 1, 320 and slice 2, 330. When the intra-slice DF/ALF/AO is applied to slice 0, 310, the process only relies on pixels within slice 0, 310 without pixels from slice 1, 320. Similarly, when the intra-slice DF/ALF/AO is applied to slice 1, 320, the process only relies on pixels within slice 1, 320 without pixels from slice 0, 310 or slice 2, 330.

Figure 9:
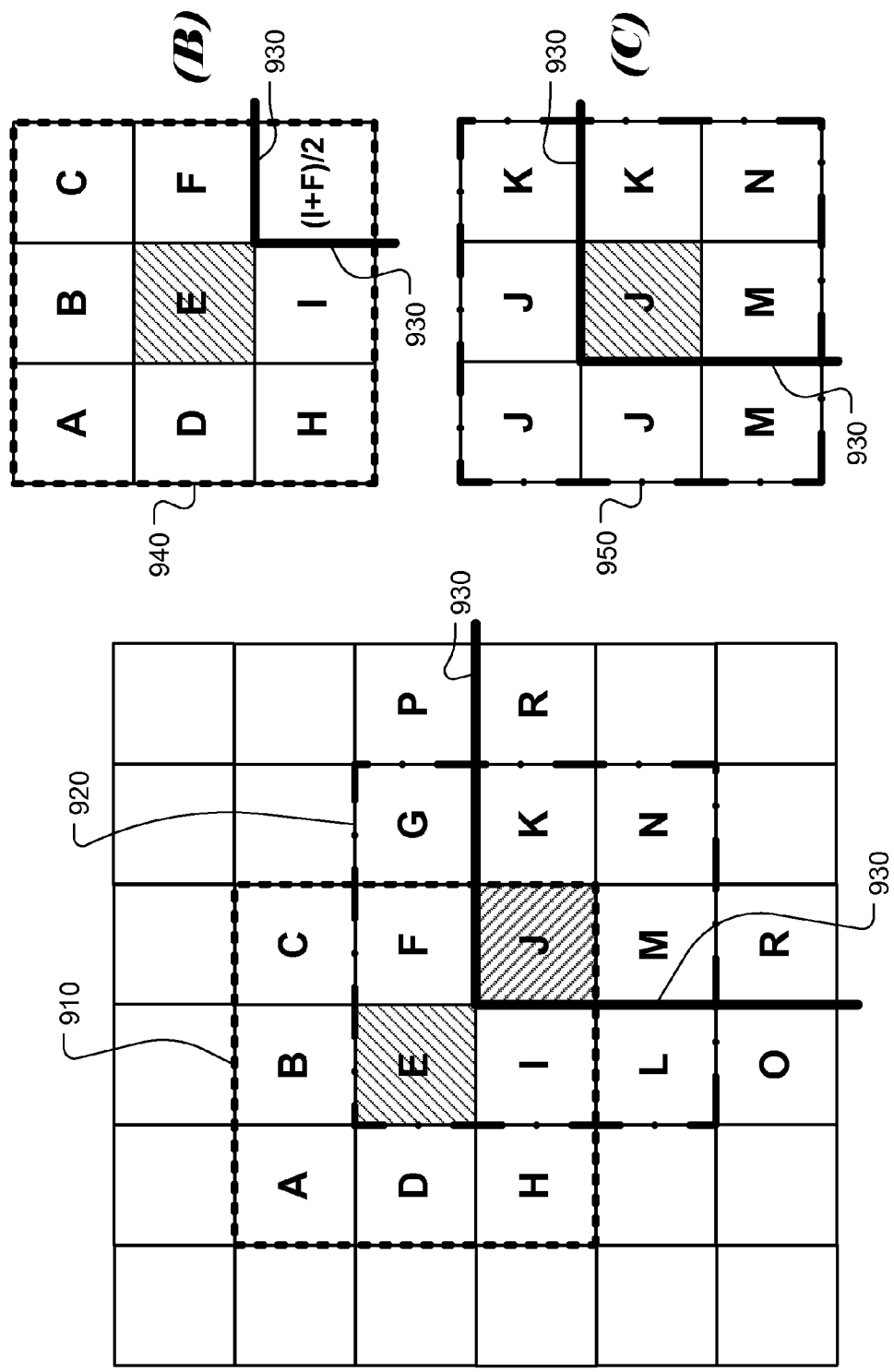
FIGS. 9(A)-(C) illustrate an exemplary ALF with slice boundary extension at slice boundaries.

The intra-slice DF according to an embodiment of the present invention will skip deblocking process for pixels at slice boundaries. On the other hand, the intra-slice ALF/AO according to the embodiment of the present invention uses data extension at slice boundaries so that ALF/AO will not rely on pixels from other slices. FIG. 9A illustrates a scenario of 3×3 ALF at slice boundaries according to the conventional ALF. The 3×3 ALF window 910 for processing pixel E includes pixels A, B, C, D, E, F, H, I and J. The slice boundaries 930 are indicated by the thick lines. As shown in FIG. 9A, the 3×3 ALF processing for pixel E involves pixel J which is in another slice. On the other hand, the 3×3 ALF window 920 for processing pixel J includes pixels E, F, G, I, J, K, L, M and N, where pixels E, F, G, I, and L are not in the same slice as pixel J. In order to remove the dependency on other slice, slice boundary extension is used. For example, the 3×3 ALF window 940 for pixel E replaces value at pixel J by (I+F)/2, where both pixels I and F are from the same slice as shown in FIG. 9B. Therefore, the 3×3 ALF 940 does not rely on pixels from other slices. The 3×3 ALF window 950 for pixel J replaces values at pixels E, F, G, I, and L by respective mirror images along the vertical and horizontal boundaries as shown in FIG. 9C. Therefore, the 3×3 ALF 950 does not rely on pixels from other slice. As shown in FIG. 7A, the operation of AO may also rely on neighboring pixels and will face the same slice boundary issue. The slice boundary extension method disclosed herein is also applicable to AO.

Figure 10A:
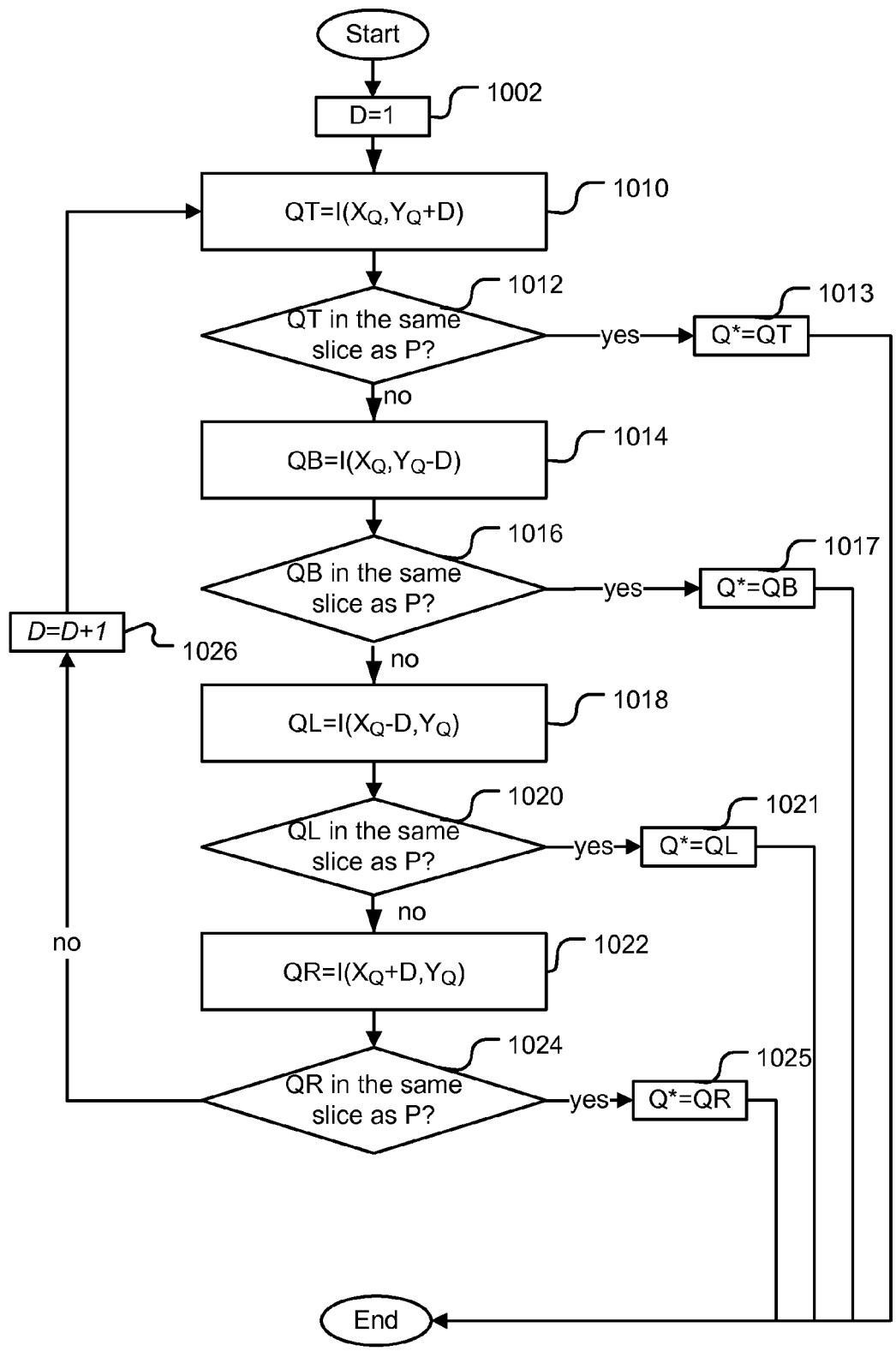
FIG. 10A illustrates vertical-first padding for ALF and AO to overcome the slice boundary issue.

While FIGS. 9B-C illustrate two examples of slice boundary extension, other methods may also be used. When the operation of ALF/AO is applied to a pixel P, the operation may rely on pixel Q that is not in the same slice as P, i.e., Q is outside the current slice. In order to generate a replacement pixel Q* for pixel Q systematically, various boundary extension methods are disclosed as follows. FIG. 10A illustrates vertical-first padding for ALF and AO to overcome the slice boundary issue. This vertical-first padding intra-slice ALF/AO replaces a pixel Q outside the slice with a closest pixel inside the slice from the vertical direction first. As shown in FIG. 10A, it starts to search for replacement pixel with a distance D equal to 1 at block 1002. It examines the pixel QT on the top side of pixel Q having a distance D, where $QT=I(X_Q,Y_Q+D)$, $(X_Q,Y_Q)$ is the location of pixel Q and I(X,Y) is the pixel value at location (X,Y). Pixel QT is checked to determine whether it is in the same slice as P in block 1012. If QT is in the same slice, then QT is selected as the replacement pixel in block 1013 and the process is done. Otherwise, the process examines the pixel QB on the bottom side of the pixel as shown in blocks 1014 and 1016. If QB is in the same slice, then QB is selected as the replacement pixel in block 1017 and the process is done. Otherwise, the process examines the pixel QL on the left side and then the pixel QR on the right side of pixel Q as shown in blocks 1018-1021 and 1022-1025. If no pixel at the current distance D can be found in the same slice as P, the distance D is incremented by 1 as shown in block 1026 and the process iterates until one replacement pixel is found in the same slice as P.

Figure 10B:
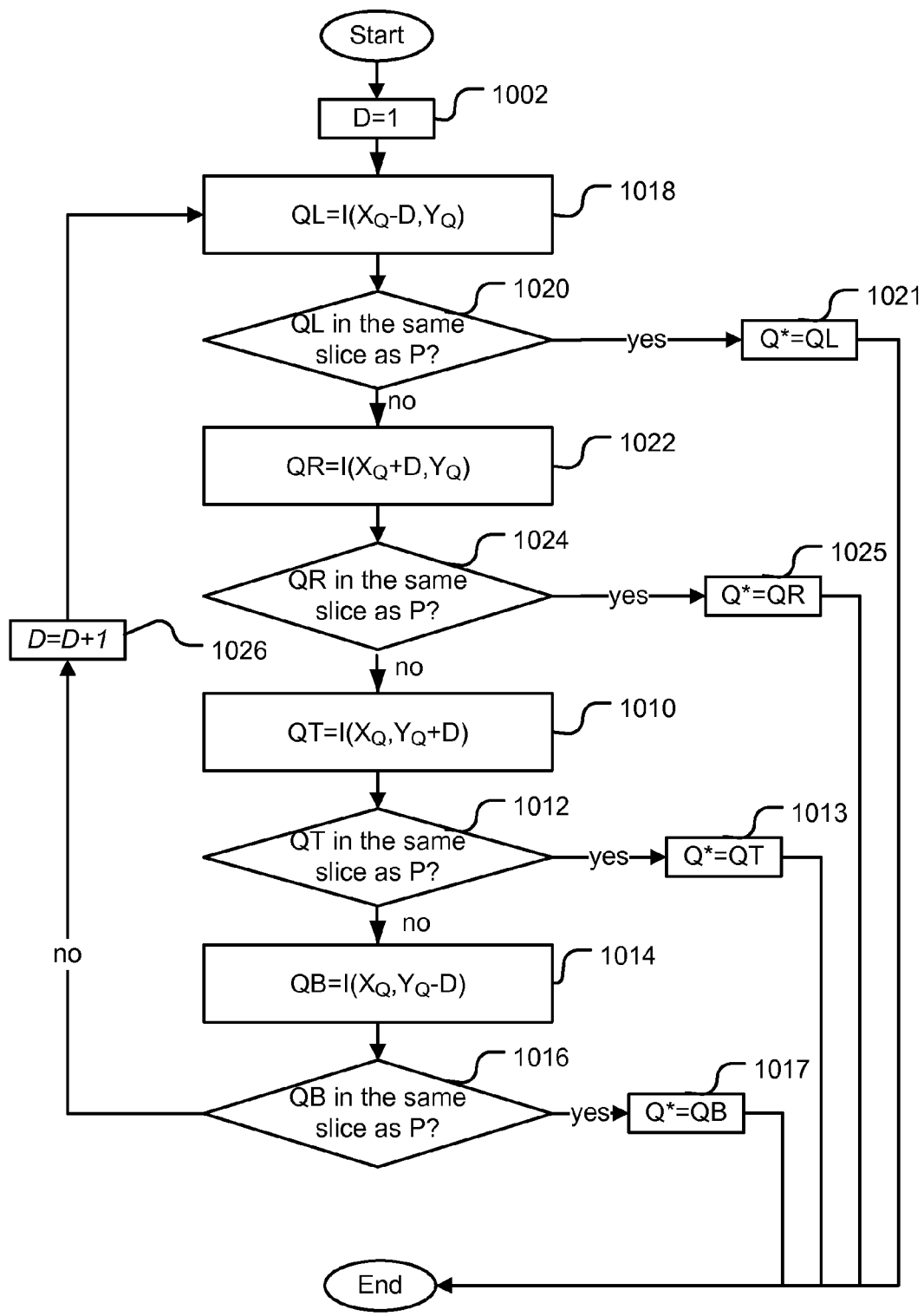
FIG. 10B illustrates horizontal-first padding for ALF and AO to overcome the slice boundary issue.

FIG. 10B illustrates horizontal-first padding for ALF and AO to overcome the slice boundary issue. The method is similar to the vertical-first padding of FIG. 10A except that it starts in the horizontal direction first. As shown, the horizontal-first padding examines the left side and then right side of pixel Q as shown in blocks 1018-1021 and 1022-1025. If no pixel in the horizontal direction having a distance D is in the same slice as P, the process examines the top side and then the bottom side of pixel Q as show in blocks 1010-1013 and 1014-1017. If no pixel at the current distance D can be found in the same slice as P, the distance D is incremented by 1 as shown in block 1026 and the process iterates until one replacement pixel is found in the same slice as P.

Figure 10C:
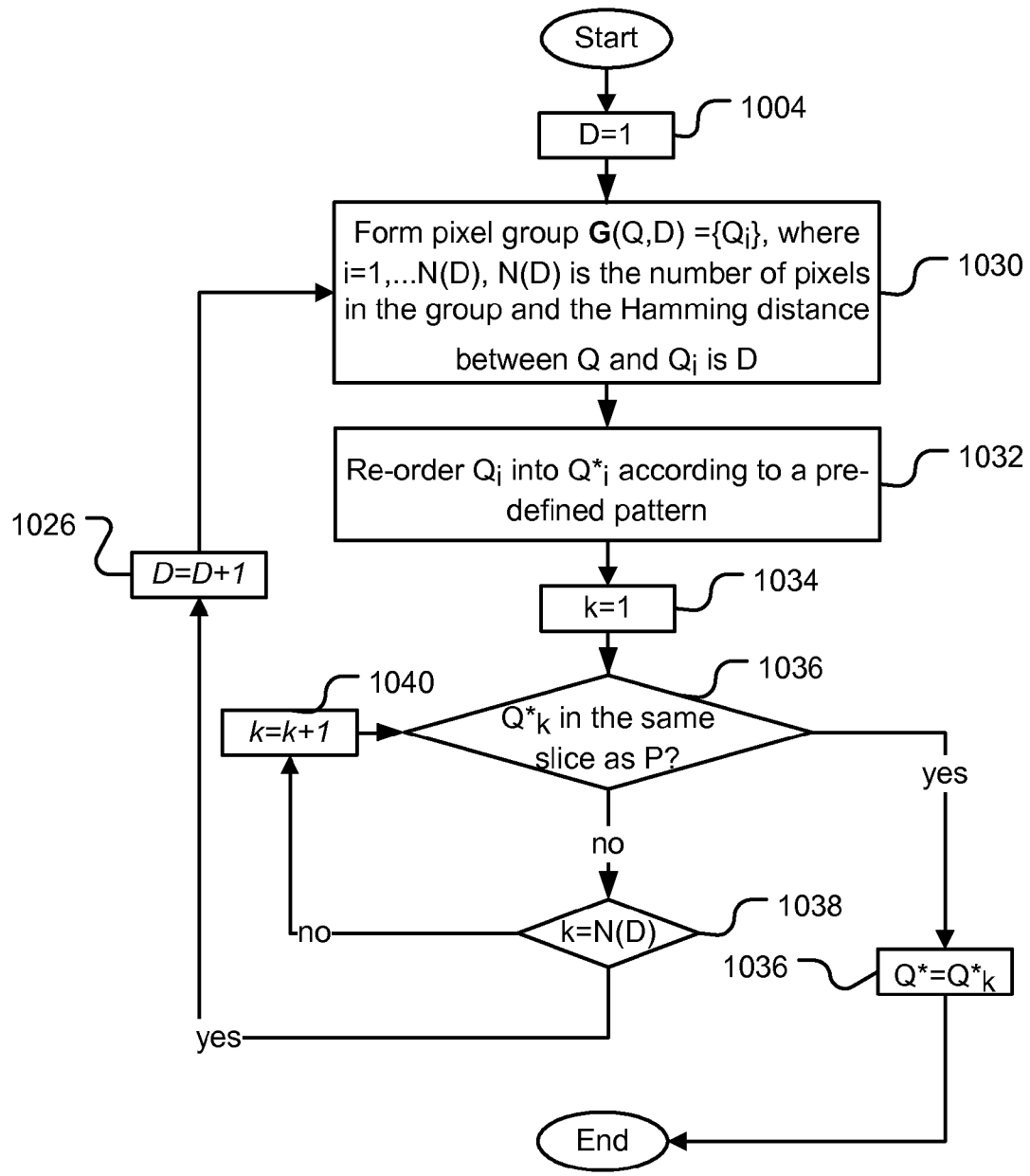
FIG. 10C illustrates padding for ALF and AO based on Hamming distance to overcome the slice boundary issue.

FIG. 10C illustrates padding for ALF and AO based on Hamming distance to overcome the slice boundary issue. The vertical-first padding and horizontal-first padding only look for replacement pixel in the same column or the same row as pixel Q to be replaced. The padding based on Hamming distance looks for replacement pixel all around pixel according to Hamming distance. The Hamming distance between two pixels is defined as the sum of their horizontal distance and vertical distance. If pixel $Q_i$ is located at $(X_i,Y_i)$, the Hamming distance $D_H$ between $Q_i$ and Q is defined as $D_H(Q_i, Q)=|X_i-X_Q|+|Y_i-Y_Q|$. The process starts with pixels having a Hamming distance 1 from pixel Q as shown in block 1004. The group G(Q,D) is formed in block 1030, where the group contains all pixels having a distance D from pixel Q. The pixels in the group is denoted as $Q_i$, where i=1, ..., N(D) and N(D) is the total number of pixels in the group having a distance D from pixel Q. For each distance D, the pixels in the associated group forms a diamond shape (i.e, a square rotated b 45°) around pixel Q and N(D) increases with distance D. Since multiple pixels in the group may be located in the same slice as pixel P, there may be multiple replacement pixels to be selected. In order to uniquely identify one replacement pixel, the pixels in the group have to be arranged in order as shown in block 1032 so that the decoder side will select the same replacement pixel. The pixel ordering for the group may start from any pixel in the group and go around the diamond shape in a clockwise or counterclockwise direction. The pixel in the group after ordering is denoted as $Q^*_i$. One of the vertices of the diamond shape, such as top, bottom, left or right, may be selected as the starting location. After the pixels in the group are arranged in order, the process searches for a replacement pixel $Q^*$ that is in the same slice as P by initializing k=1 in block 1034, and checking if $Q^*_k$ is in the same slice as P as shown in block 1036. If $Q^*_k$ is in the same slice as P, $Q^*_k$ is used as the replacement pixel for Q as shown in block 1037; otherwise, "if k=N(D)" is checked in block 1038. If $Q^*_k$ is not the last pixel in the ordered group, i.e., k≠N(D), then k is incremented in block 1040 and next $Q^*_k$ is test in block 1036. If $Q^*_k$ is the last pixel in the ordered group, i.e., k=N(D) in block 1038, then the process increments D in block 1026 and next group G(Q,D) is formed in block 1030 and the process iterates until a replacement pixel $Q^*$ is found.

Figure 10D:
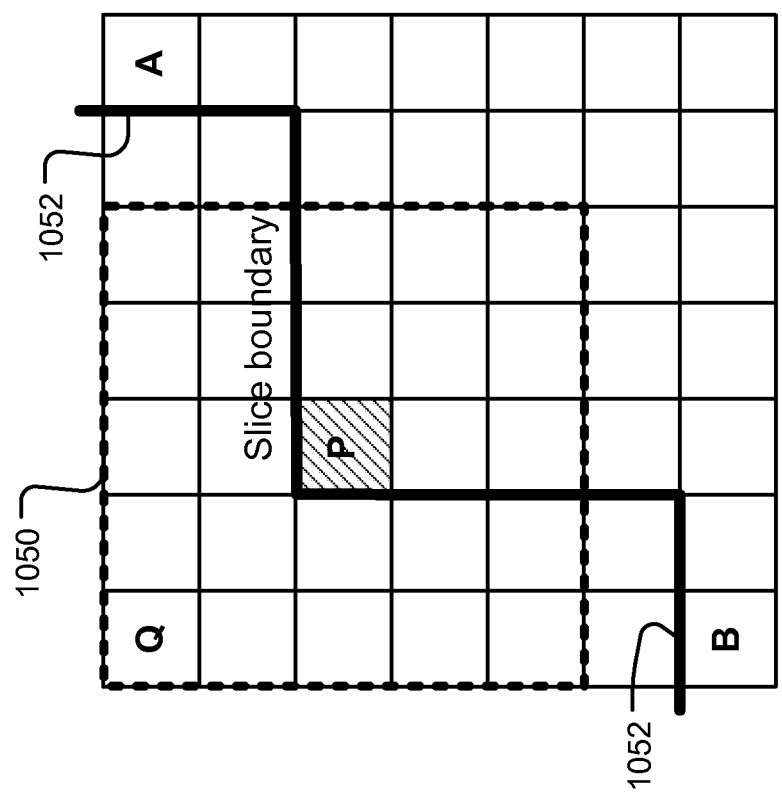
FIG. 10D illustrates an example of data padding for a 5×5 ALF based on various methods.

FIG. 10D illustrates an example of data padding for a 5×5 ALF filter based on various methods described above. The 5×5 filter for pixel P is indicated by the dashed box 1050. The thick line 1052 indicates the boundaries between two slices. As shown in FIG. 10D, the 5×5 filter relies on a pixel Q which is outside the slice for pixel P. According to the vertical-first padding of FIG. 10A, pixel B in the same slice as P is used as the replacement pixel. According to the horizontal-first padding of FIG. 10B, pixel A in the same slice as P is used as the replacement pixel. According to the Hamming distance method of FIG. 10C, pixel Q is replaced by pixel P itself.

Figure 11:
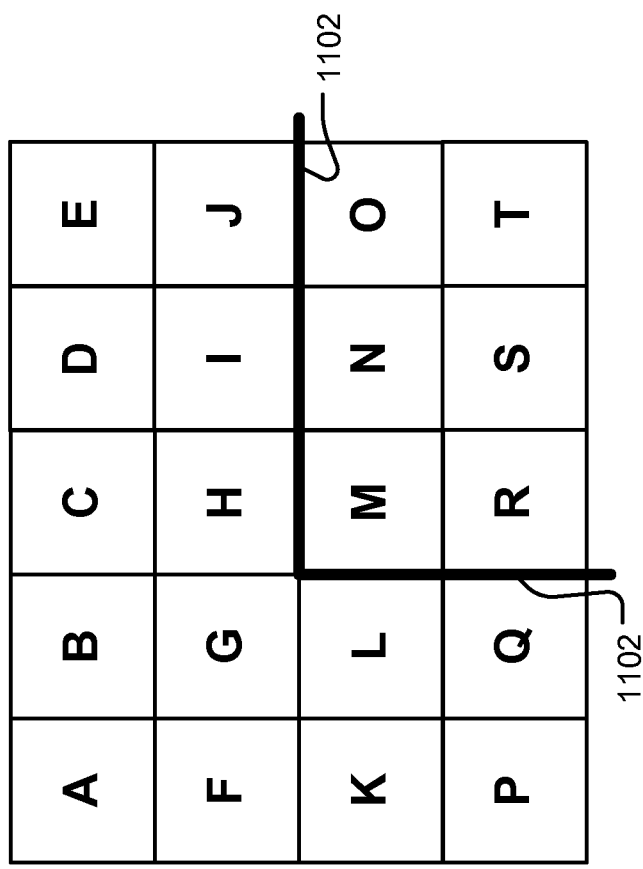
FIG. 11 illustrates an exemplary method of bypassing boundary pixels for a 3×3 ALF/AO filter.

While various boundary extension methods are disclosed above to remove the dependency of ALF/AO on other slices, the dependency may also be overcome by bypassing ALF/AO wherever the ALF/AO operations require pixels from any other slice. FIG. 11 illustrates an exemplary method of bypassing boundary pixels for a 3×3 ALF/AO filter, where the boundaries between two slices are indicated by the thick line 1102. For all pixels immediately next to the boundaries, i.e., pixels Q, L, G, H, I and J, the 3×3 ALF/AO filter relies on at least one pixel in the other slice. Consequently, according to the bypass method, the ALF/AO operation is not applied to pixels Q, L, G, H, I and J.

As disclosed above, the intra-slice ALF and AO do not have any dependency on any other slice. Therefore, whenever the associated slice layer bitstream is received, a slice can be processed without waiting for any other slice data. The intra-slice ALF and AO can be applied after DF. Upon completion of the intra-slice ALF and/or AO, artifacts at slice boundaries may be visible. To reduce the visibility of the artifacts at slice boundaries processed by the intra-slice ALF and/or AO, a slice boundary filter (SBF) can be applied to slice boundaries. The same DF can be used for the SBF purpose. Nevertheless, other suitable filters may also be used for the SBF purpose. The SBF process can be applied to slice boundaries in an IIR fashion. In this case, the processing order of the slice boundaries has to be specified so that the same processing can be performed at the decoder side. Alternatively, the SBF process may also be performed in an FIR fashion.

Figure 12:
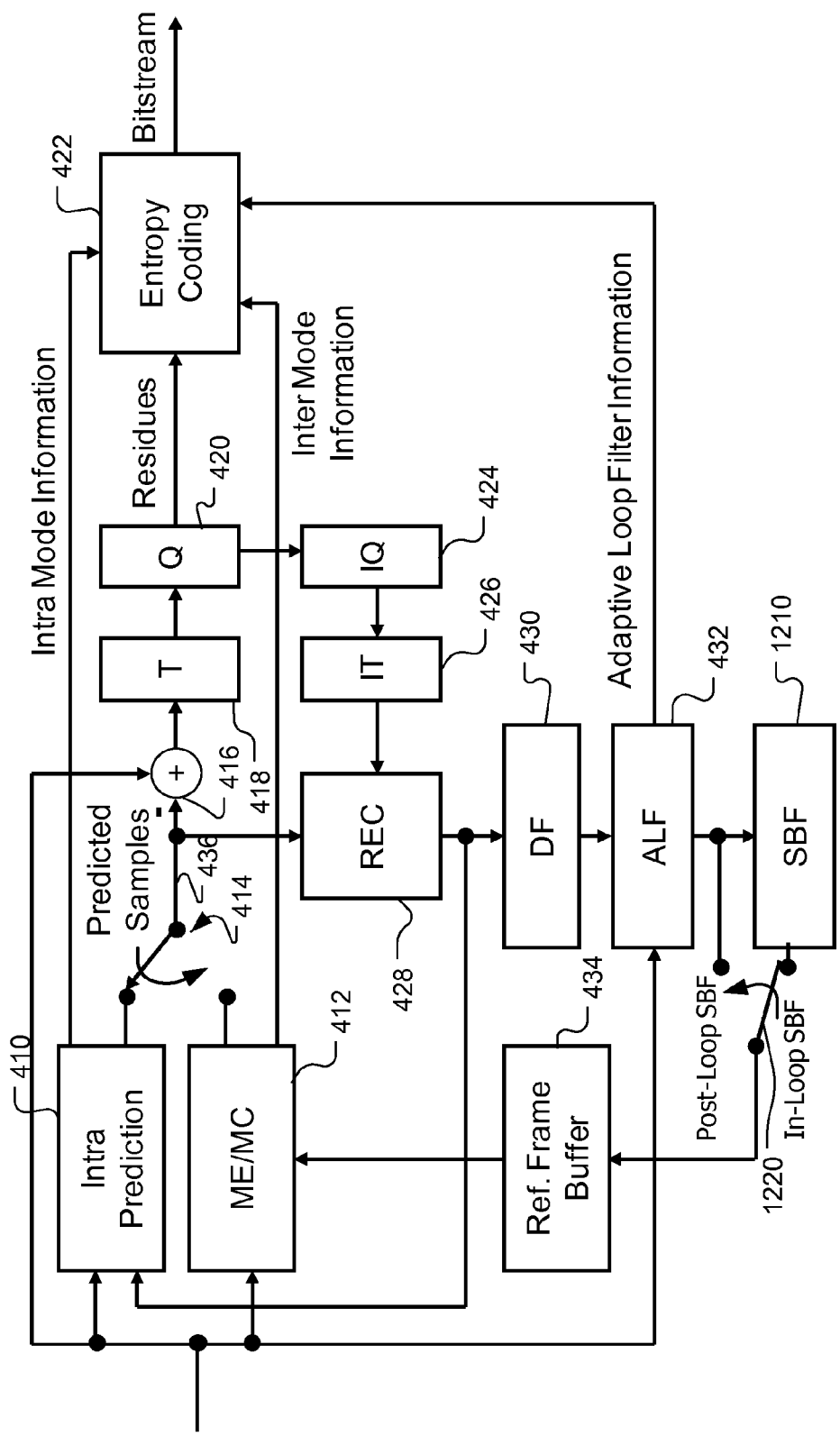
FIG. 12 illustrates a system block diagram of a video encoder for high efficiency video coding embodying the slice boundary filter according to an embodiment of the present invention.

The SBF can be arranged for in-loop operation or post-loop operation. FIG. 12 illustrates a system block diagram of a video encoder for high efficiency video coding embodying the intra-slice DF 430, ALF 432 and SBF 1210 according to an embodiment of the present invention. As shown in FIG. 12, the SBF 1210 according to this embodiment is applied to signal processed by ALF 432. Intra-slice AO can be applied between DF 430 and ALF 432, or ALF 432 and SBF 1210. AO is not explicitly shown in FIG. 12. A switch 1220 is used to select the SBF configuration between post-loop SBF and in-loop SBF, where the switch 1220 is shown in the in-loop SBF position. When the in-loop SBF is selected, the decoder must be operated in the in-loop SBF configuration as well in order to properly reconstruct the video data. When the post-loop SBF configuration is selected, the post-processed video at the encoder side can be used for local monitoring and the decoder side must be operated in the post-loop mode as well.

Figure 13:
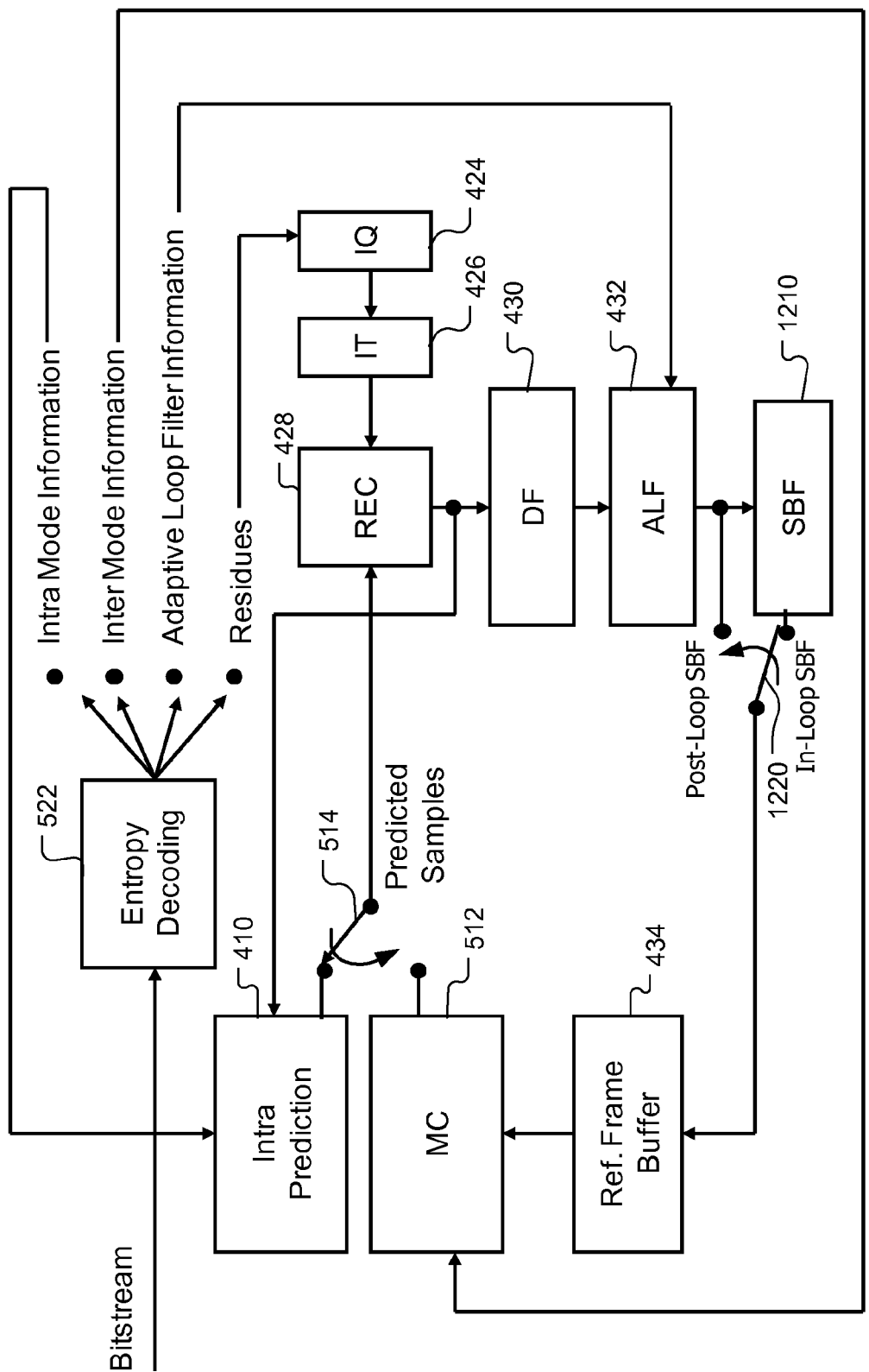
FIG. 13 illustrates a system block diagram of a video decoder for high efficiency video coding embodying the slice boundary filter according to an embodiment of the present invention.

FIG. 13 illustrates a system block diagram of a video decoder for high efficiency video coding embodying the intra-slice DF 430, ALF 432 and slice boundary filter according to the present invention. As shown in FIG. 13, the SBF 1210 according to the present invention is applied to signal processed by ALF 432. Intra-slice AO can be applied between DF 430 and ALF 432, or ALF 432 and SBF 1210. AO is not explicitly shown in FIG. 13. A switch 1220 is used to select the SBF configuration between post-loop SBF and in-loop SBF, where the switch 1220 is shown in the in-loop SBF position. When the post-loop SBF configuration is selected, the post-processed video provides improved video quality at the decoder side.

In order to communicate the required information to the decoder so that the decoder may properly perform the intra-slice ALF/AO and the SBF operation, associated syntax is developed for incorporated into the bitstream. When a picture is divided into slices, each slice may have its own ALF/AO information (such as ALF parameter set) in the slice header. However, when the number of slices increases, the coding efficiency of ALF/AO information will decrease due to the increase of ALF/AO information in the picture. Therefore, as an alternative, a picture layer raw byte sequence payload (RBSP), pic_layer_rbsp, can be used to transmit ALF/AO information so that all slices in the picture can share the same ALF/AO information. The picture order count information also has to be sent in the pic_layer_rbsp for proper decoding. The slice-level ALF/AO information and picture-level ALF/AO information can be switched in sequence parameter set (SPS). FIG. 14A illustrates an exemplary sequence parameter set syntax associated with the intra-slice DF/ALF/AO and slice boundary filter according to the present invention. The slice_boundary_filter_flag is used to indicate whether SBF is applied to slice boundaries, where a value equal to 0 denotes that SBF is not applied for slice boundaries after DF and ALF and a value equal to 1 denotes that slice boundary filtering is applied for slice boundaries after DF and ALF. Before slice boundary filtering, all slices of one picture can be decoded independently due to the use of intra-slice ALF. The syntax for incorporation of AO information in the pic_layer_rbsp for slices to share or for each slice to use its own AO information can be extended based on the example in FIG. 14A. When slice_boundary_filter_flag has a value 1, seq_parameter_set_rbsp contains slice_boundary_filter_in_loop_flag to indicate whether SBF is configured as in-loop SBF or post-loop SBF; where a value equal to 1 denotes an in-loop configuration and a value equal to 0 denotes a post-loop configuration. The seq_parameter_set_rbsp also contains adaptive_loop_filter_pic_layer_flag to indicate whether ALF information will be incorporated in the picture layer. The ALF information in the picture layer allows slices in a picture share a same ALF parameter set. An adaptive_loop_filter_pic_layer_flag value equal to 0 denotes that ALF information will not be incorporated in the picture layer and an adaptive_loop_filter_pic_layer_flag value equal to 1 denotes that ALF information will be incorporated in the picture layer.

FIG. 14B illustrates an exemplary picture layer syntax associated with the intra-slice DF/ALF/AO and slice boundary filter according to the present invention. The pic_layer_rbsp contains pic_order_cnt_lsb that is used to derive the picture order count. If adaptive_loop_filter_pic_layer_flag has a value 1, the ALF parameter set, alf_param( ), will be incorporated in the pic_layer_rbsp so that all slices in the picture will share the same ALF parameter set.

FIG. 14C illustrates an exemplary slice header syntax associated with the intra-slice DF/ALF/AO and slice boundary filter according to the present invention. In the case that adaptive_loop_filter_pic_layer_flag has a value 0, the ALF parameter set, alf_param( ) will be incorporated in the slice header so that each slice can have its own ALF parameter set. While the example in FIGS. 14A-C is provided for incorporating ALF information only, similar method can be used to incorporate AO information for slices to share or each slice to use its own.

The syntax design according to FIG. 14A-C will require all slices in a picture to share the same ALF information or each slice uses its own ALF and/or AO information. An alternative syntax design to embody the present invention is illustrated in FIGS. 15A-C to allow each slice to selectively use the ALF information for the picture or its own ALF information. The syntax for sequence layer shown in FIG. 15A is similar to the sequence layer syntax in FIG. 14A except for the elimination of adaptive_loop_filter_pic_layer_flag. Instead, adaptive_loop_filter_pic_layer_flag is moved to slice layer so that each slice can selectively use the ALF information in the picture header or its own ALF information as shown in FIG. 15C. The ALF information for the picture is always transmitted in the picture layer as shown in FIG. 15B for slices in the picture to use. Consequently, the syntax design of FIG. 15A-C provides a more flexibility so that some slices in a picture can share the same ALF information while each of other slices has its own ALF information. While FIGS. 15A-C illustrate an example of incorporation of ALF information for slices to share or each slice to have its own, the AO information may also be incorporated for slices to share or each slice to have its own.

The invention may be embodied in other specific forms without departing from its spirit or essential characteristics. The invention may be embodied in hardware such as integrated circuits (IC) and application specific IC (ASIC), software and firmware codes associated with a processor implementing certain functions and tasks of the present invention, or a combination of hardware and software/firmware. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for coding of video pictures, wherein each of the video pictures is partitioned into largest coding units (LCUs) and each LCU is split into one or more coding units (CUs), and each of the video pictures is also partitioned into slices and each of the slices consists of multiple CUs, the method comprising:
reconstructing each of the slices to form a reconstructed slice consisting of reconstructed CUs;
if one or more first reconstructed samples required for a filtering process of a current reconstructed sample is in a same slice as the current reconstructed sample, applying the filtering process to the current reconstructed sample using said one or more first reconstructed samples; and if said one or more first reconstructed samples required for the filtering process of the current reconstructed sample is not in the same slice as the current reconstructed sample, performing one of: bypassing the filtering process for the current reconstructed sample, and applying the filtering process to the current reconstructed sample using one or more extended samples generated from one or more second reconstructed samples in the same slice to replace said one or more first reconstructed samples.

2. The method of claim 1, wherein a current reconstructed CU comprising the current reconstructed sample is processed by deblocking filtering (DF) before said applying the filtering process to the current reconstructed sample.

3. The method of claim 1, wherein the filtering process corresponds to ALF (adaptive loop filtering), AO (adaptive offset), or a combination of the ALF and the AO.

4. The method of claim 3, wherein said generating one or more extended samples uses said one or more second reconstructed samples in the same slice according to vertical-first or horizontal-first padding to generate said one or more extended samples.

5. The method of claim 3, wherein said generating one or more extended samples uses said one or more second reconstructed samples in the same slice according to linear interpolation to generate said one or more extended samples.

6. The method of Claim 3, wherein said generating one or more extended samples uses said one or more second reconstructed samples in the same slice according to Hamming distance to generate said one or more extended samples.

7. The method of claim 3, wherein said generating one or more extended samples uses said one or more second reconstructed samples in the same slice according to boundary pixel mirroring to generate said one or more extended samples.

8. The method of claim 1, wherein each of the slices has individual ALF and/or AO information in slice header associated with said each of the slices.

9. The method of claim 1, wherein at least two slices in one of the video pictures share at least a portion of ALF and/or AO information.

10. The method of claim 9, wherein said at least a portion of ALF and/or AO information shared by the slices in one of the video pictures is incorporated in picture layer RBSP (raw byte sequence payload).

11. The method of claim 1, the method further comprising:
incorporating SBF (slice boundary filter), wherein the SBF is applied across slice boundaries to filter slice boundary pixels.

12. The method of claim 11, further comprising:
incorporating a first flag in a sequence level bitstream or a picture level bitstream to indicate if the SBF is enabled or disabled.

13. The method of claim 11, wherein the SBF is configured for in-loop operation or post-loop operation; and wherein the in-loop operation stores SBF filtered pixels in a reference picture buffer for predicting future pictures and the post-loop operation does not store SBF filtered pixels for predicting future pictures.

14. The method of claim 13, further comprising:
incorporating a second flag in a sequence level bitstream or a picture level bitstream to indicate if the in-loop operation or the post-loop operation is selected.

15. The method of claim 11, wherein the SBF is selecting from an FIR (finite impulse response) filter or an IIR (infinite impulse response) filter, wherein the FIR filter operates on non-SBF processed pixels; and the IIR filter specifies a processing order, operates on the non-SBF processed pixels for a current pixel and subsequent pixels, and operates on SBF processed pixels for prior pixels.

16. The method of claim 15, further comprising:
incorporating a third flag in a sequence level bitstream or a picture level bitstream to indicate if the FIR filter or the IIR filter is selected.

17. The method of claim 1, further comprising:
incorporating a syntax element in picture layer RBSP (raw byte sequence payload) to
allow sharing of ALF and/or AO information by at least two slices in one of the video pictures.

18. The method of claim 17, further comprising:
incorporating individual ALF and/or AO information in slice header of a current slice according to a condition indicated by the syntax element in picture layer RBSP.

19. A method for decoding of a video bitstream corresponding to video pictures, wherein each of the video pictures is partitioned into largest coding units (LCUs) and each LCU is split into one or more coding units (CUs), and each of the video pictures is also partitioned into slices and each of the slices consists of multiple CUs, the method comprising:
reconstructing each of the slices to form a reconstructed slice consisting of reconstructed CUs according to the video bitstream;
recovering ALF and/or AO information from the video bitstream; and
if one or more first reconstructed samples required for a filtering process of a current reconstructed sample is in a same slice as the current reconstructed sample, applying the filtering process to the current reconstructed sample using said one or more first reconstructed samples according to the ALF and/or AO information to provide a processed slice; and
if said one or more first reconstructed samples required for the filtering process of the current reconstructed sample is not in the same slice as the current reconstructed sample, performing one of: bypassing the filtering process for the current reconstructed sample, and applying the filtering process to the current reconstructed sample using one or more extended samples generated from one or more second reconstructed samples in the same slice to replace said one or more first reconstructed samples.

20. The method of claim 19, wherein the ALF and/or AO information is in slice header associated with the reconstructed slice.

21. The method of claim 19, wherein at least a portion of the ALF and/or AO information is in picture layer RBSP (raw byte sequence payload).

22. The method of claim 19, the method further comprising:
recovering SBF information from the video bitstream; and
processing the processed slice using SBF (slice boundary filtering) according to the SBF information, wherein the SBF is applied across slice boundaries to filter slice boundary pixels.

23. The method of claim 22, wherein the SBF information indicates if the SBF is enabled or disabled.

24. The method of claim 22, wherein the SBF information indicates whether an in-loop operation or a post-loop operation is selected for the SBF.

25. The method of claim 22, wherein the SBF information indicates whether FIR filter or IIR filter is selected for the SBF.

26. The method of claim 19, wherein the ALF and/or AO information is in picture layer RBSP (raw byte sequence payload) of the video bitstream.

27. The method of claim 26, wherein the ALF and/or AO information is in slice header associated with the reconstructed slice according to a condition indicated by a syntax element in the picture layer RBSP.

28. A method for decoding of a video bitstream corresponding to video pictures, wherein each of the video pictures is partitioned into largest coding units (LCUs) and each LCU is split into one or more coding units (CUs), and each of the video pictures is also partitioned into slices and each of the slices consists of multiple CUs, the method comprising:

reconstructing each of the slices to form a reconstructed slice consisting of reconstructed CUs according to the video bitstream;

if a high-level flag indicates filter parameter sharing, determining filter parameters associated with adaptive loop filter (ALF) or adaptive offset (AO) processing in a sequence layer, a picture layer, or both of a video bitstream;

if the high-level flag indicates no filter information sharing, determining the filter parameters associated with the ALF or the AO processing in a slice layer of the video bitstream; and applying said ALF or AO processing to the reconstructed CUs in each reconstructed slice using the filter information determined.

\* \* \* \* \*